United States Patent [19]

Lurie

[11] Patent Number: 5,009,825
[45] Date of Patent: Apr. 23, 1991

[54] PRODUCTION OF EXTRUDED ROUND ROD

[76] Inventor: Mark Lurie, 3115 Embassy Dr., West Palm Beach, Fla. 33401

[21] Appl. No.: 375,149

[22] Filed: Jun. 30, 1989

[51] Int. Cl.$^5$ .............................................. B29C 47/90
[52] U.S. Cl. .................... 264/148; 264/210.2; 264/211.12; 264/237; 264/310; 425/325; 425/392; 425/404; 425/377; 425/384
[58] Field of Search ............... 264/211.12, 310, 237, 264/280, 176.1, 210.2, 148; 425/325, 392, 384, 327, 378.1, 376.1, 404; 526/328.5

[56] References Cited

U.S. PATENT DOCUMENTS

| | | | |
|---|---|---|---|
| 3,026,564 | 3/1962 | Kohlwey | 425/378.1 |
| 3,039,142 | 6/1962 | Zavasnik | 264/237 |
| 3,078,513 | 2/1963 | Levison et al. | 425/378.1 |
| 3,205,289 | 9/1965 | Carpenter | 425/393 |
| 3,275,730 | 9/1966 | Feild | 264/280 |
| 3,393,256 | 7/1968 | Zambernard | 264/148 |
| 3,494,990 | 2/1970 | Balint | 264/310 |
| 3,551,545 | 12/1970 | Overdiep | 264/323 |
| 4,141,953 | 2/1979 | Kepes et al. | 264/340 |
| 4,194,872 | 3/1980 | Hinterkeuser et al. | 426/327 |

FOREIGN PATENT DOCUMENTS

| | | | |
|---|---|---|---|
| 59-127742 | 7/1984 | Japan | 264/176.1 |
| 60-176742 | 9/1985 | Japan | 264/280 |

*Primary Examiner*—Jeffery Thurlow
*Attorney, Agent, or Firm*—Hayes, Soloway, Hennessey & Hage

[57] ABSTRACT

A method of producing round rod formed of thermoplastic material by extrusion is described. The rod, following extrusion, is first heated and then cooled while rotating fully supported on rollers. The rollers impart a concentric outer surface shape to the extruded rods and permit uniform cooling across the entire cross section of the extruded rod.

16 Claims, 1 Drawing Sheet

U.S. Patent  Apr. 23, 1991  5,009,825
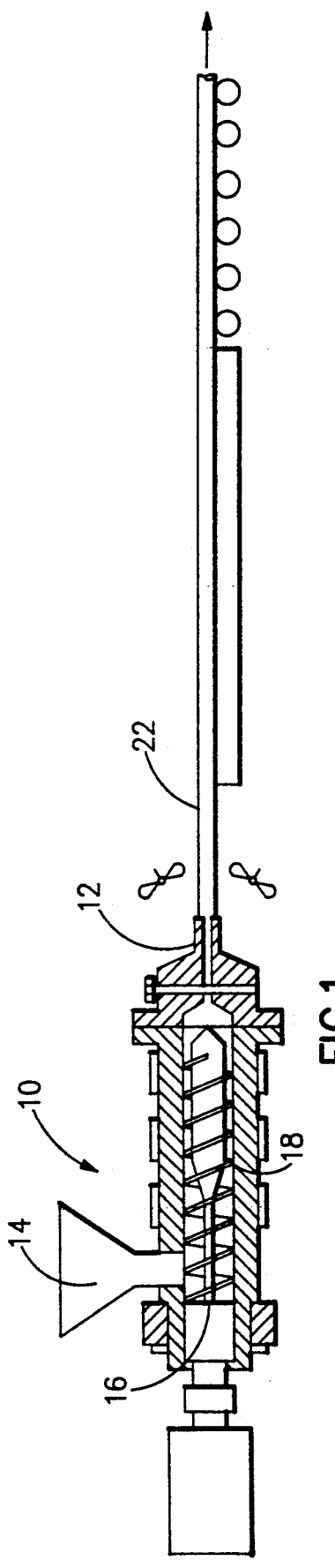
FIG.1
PRIOR ART
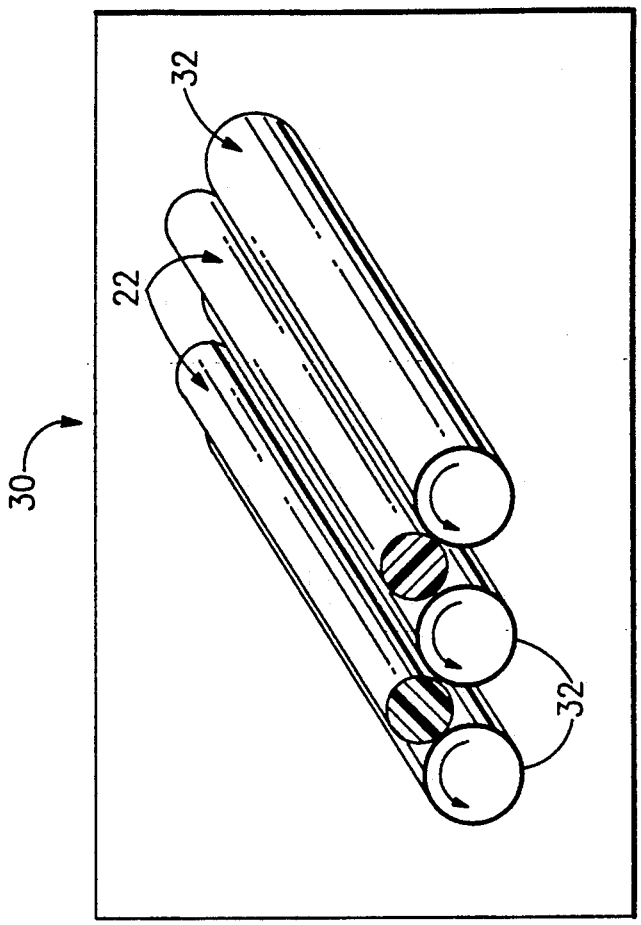
FIG.3
FIG.2

PRODUCTION OF EXTRUDED ROUND ROD

FIELD OF THE INVENTION

The present invention relates to a system for producing round rod, and more particularly to a method and apparatus for producing round rods from a thermoplastic material by extrusion. The invention has particular utility in connection with the production of round rods formed of acrylic materials, and will be described in connection with such utility, although other uses are contemplated.

BACKGROUND OF THE INVENTION

Conventional extrusion of thermoplastic rods such as acrylic rods is normally accomplished by the use of an extruder which typically consists of a screw mechanism rotating within a piston chamber. The action of the screw mechanism mixes and melts the synthetic thermoplastic contained in the piston chamber primarily by the mechanical actions of compression and shearing. The synthetic thermoplastic material, as a result of this mechanical action, becomes plastic and is then able to be squeezed out through a die opening on the outlet end of the extruder which imparts the desired final shape to the rod. Since the extruded synthetic material is above its glass transition temperature (i.e. the temperature at which the synthetic material changes from a solid to a plastic) as it exits the extruder die, it must be cooled immediately as it exits from the extruder die so that the extruded rod retains its extruded shape. Cooling typically is accomplished by blowers, fans and the like which are directed at the die outlet.

Cooling, i.e. by blowing, merely cools the outer periphery of the extruded rod. While this is sufficient so that the rod will retain generally the shape imparted by the extruder die, stresses and voids may be formed internally of the rod as it cools. More particularly, with surface cooling of the rod only the outer periphery initially solidifies. This prevents the rod from contracting across its full diameter as it further cools. Consequently, as the internal plastic molecules take up less volume after they have cooled and shrunk, the remaining empty space in the interior of the rod is filled by stretching of the remaining molecules. The net effect of this non-uniform cooling is that the outer wall of the rod sets first and becomes fixed (because it has solidified) while the interior plastic material continues to contract as it cools and solidifies. This uneven cooling can result in the formation of voids, bubbles and interior molecular stresses in the interior of the extruded product. This phenomena is particularly acute in the case of rods formed of acrylic due to inherent good heat insulating characteristics of acrylic molecules. A major problem which results from the presence of interior bubbles or voids and molecular stresses is that a fracture or chip in the rod can occur when the rod is drilled, machined or otherwise manipulated.

The contraction problem becomes more significant as the diameter and wall thickness of the rod increases since the amount of contraction of the interior plastic material is directly related to the diameter of the rod. For example, in the case of rods formed of acrylic materials having diameters of approximately 1¾", the amount of diametric stretching within the interior of the rod becomes so great that the interior molecules typically can no longer withstand the stress. The molecules thus may tear apart from one another during contraction and form bubbles or voids within the rod. As a result, there heretofore has been a practical limitation upon the maximum diameter that extruded acrylic rods can be acceptably produced at normal production rates.

SUMMARY OF THE INVENTION

The present invention provides a system, i.e. method and apparatus which overcomes the aforesaid and other limitations of the prior art. More specifically, the present invention provides a method and apparatus for producing extruded rod rounds of virtually any size diameter which are free of bubbles, voids or external stresses.

More particularly, one aspect of the present invention provides for post extrusion heat treating of the extruded product. Specifically, extruded rod formed by conventional extrusion process is placed in an oven and heated to a temperature above the glass transition temperature of the product while being continuously rotated on rollers. The rollers impart a concentric outer surface shape to the heated extruded product. Thereafter, the oven temperature is reduced, and the product slowly cooled while being continually rotated on the rollers. Heating the rods to above the glass transition temperature, and then slowly cooling the rods under rotation results in substantially uniform cooling of the rods and concurrent elimination of internal cooling stress, bubbles and voids as may have been present in the initial product. In a preferred embodiment of the invention, the temperature of the rollers can be controlled by the circulation of a heat exchanger fluid internally through the rollers so as to maintain the rollers at a temperature slightly below the temperature of the oven.

DESCRIPTION OF THE DRAWINGS

The present invention may be better understood having reference to the annexed drawings which illustrate the preferred method of the invention, it being understood that minor changes employing the same principles may be made as will become readily apparent to those skilled in the art, wherein:

FIG. 1 shows a cross section through a round rod extruder of the prior art;

FIG. 2 diagrammatically shows the process of the present invention; and

FIG. 3 shows a cross section to the oven employed by the present invention.

DETAILED DESCRIPTION OF THE DRAWINGS

Referring first to FIG. 1, there is shown the conventional extrusion of a round rod using a standard extruder machine 10 and die 12. Extruder machine 10 includes a feed hopper 14 for feeding a synthetic thermoplastic material into the piston 16 of screw mechanism 18. Screw mechanism 18 is powered by conventional means and mixes and melts the synthetic material contained in the piston by mechanical action of compression and shearing. The melted material is then extruded through die 12 which imparts the desired final shape to the resulting rod 22. The resulting rod 22 is cooled immediately upon its expression from the die, e.g. as by means of cooling fans or the like, and collected as product.

Referring to FIGS. 2 and 3, in accordance with the present invention, the round rod is formed initially in a conventional extruder machine 10 as illustrated in FIG. 1, and the extruded rod is cooled. Preferably the expressed rod is insulated at insulating tunnel 40 during cooling so that its transition to a solid state is slowed. This permits a more uniform rate of cooling, and of contraction, throughout the cross-section of the rod, and avoids the formation of cooling vacuum bubbles from stresses produced by rapid cooling. Alternatively, the rods may be treated with low level heat, for example, using convection heating means 50 operating at a temperature which is lower than the temperature of the rods, to slow the rate of cooling. However, even under retarded cooling conditions, the resulting rod may not conform to the shape of the die, i.e. it becomes nonconcentric. The cooled rod is then cut to a convenient handling length small enough to fit into the post extrusion heating oven 30 as will be described in detail hereinafter. The extruded rod is then placed in oven 30, and is slowly and uniformly heated to above the glass transition temperature of the product, while being constantly rotated on rollers 32. Once the rod is uniformly heated to above its glass transition temperature, the rod is then slowly cooled while rotated on rollers 32.

Heating the rods to above the glass transition temperature returns the rods to a plastic state so that when they are slowly cooled in oven 30 while being rotated on the rollers 32, the extruded rods may be uniformly cooled across the entire cross section. This eliminates voids, bubbles and internal molecular stresses.

Referring in particular to FIG. 3, oven 30 comprises a plurality of uniformly spaced rollers 32 which are aligned substantially parallel to one another and all lying in a common plane. The diameters, lengths, etc. of these rollers are selected so that sufficient "rolling" of the outer circumference of the rods is achieved to thereby impart a concentric outer periphery shape into the extruded rod. In FIG. 3, the rollers, only three of which are shown, consist of 74" long TEFLON-coated steel rollers or tubes each having a diameter of three inches. (Teflon is a trademark of E. I. DuPont de Nemores and Company for a non-stick finish formed of tetrafluoroethylene fluorocarbon polymer materials.) The rollers or tubes can be made from other materials such as aluminum, brass or almost any other rigid metal. Chrome coated steel rollers also may be used.

The rollers are supported on a conventional support assembly (not shown) and are driven in the same rotational direction by conventional drive means, not shown, such as a chair or belt drive arrangement. It is preferred that the rotation of the rollers remain constant throughout the entire heating/cooling process. An extruded rod 22 is placed between and atop each adjacent pair of rollers 32 (see FIG. 3) so that the maximum number of extruded rods which can be accommodated by the roller system is one less than the maximum number of rollers.

In the process of the present invention, the extruded rods 22 are placed on the rollers 32 and the oven is then closed and heat is supplied to the oven 30 by heating means (not shown) to gradually raise the temperature within the oven 30 and the rotating extruded rods 22 to a temperature above the glass transition state of the synthetic material forming the round rods.

It has been observed that within oven 30 rollers 32 typically pick up heat faster than the rod being treated. In order to avoid excess heating of the rollers, in a preferred embodiment of the invention, a heat exchanger fluid, for example, oil, may be circulated in known manner through the rollers so that the roller temperature may be maintained within a desire range. Any excess heat may be removed from the heat exchanger fluid using conventional heat exchanger and heat dissipating means (not shown). For example, in the case of acrylic rods, the oven should be heated to an internal temperature of about 330° F., while the rollers should be maintained at a temperature of about 310° F.

Throughout the heat treatment process, it is preferred that the rollers rotate at a slow constant speed so that as the extruded rods become plastic throughout their cross sections, the rotating rollers can impart a round concentric shape to each rod. Once the rods are uniformly heated through to a temperature above the glass transition temperature of the product, the temperature of the oven is slowly lowered, with the rollers continuing to rotate, so that the rods are cooled at a uniform rate throughout their cross sections. The net result of this controlled heat/cooling treatment process is that the rods cool uniformly throughout and thus have concentric shapes which are free from bubbles, voids and internal molecular stresses. Moreover, a void free rod is achieved irrespective of the length and diameter of the rod as long as the heating and cooling parameters are adequately controlled.

Certain changes may be made with respect to the above process without departing from the spirit and scope of the invention herein involved, and it is intended that all matter contained in the above description or shown in the accompanying drawings shall be interpreted in the illustrative and not in the limiting sense.

I claim:

1. In a method of producing a round rod formed of thermoplastic material by extrusion in a conventional extruder, the improvement which comprises the steps in sequence of:
    A. cooling the extruded rod as it is expressed from the extruder;
    B. cutting the extruded rod to a predetermined length;
    C. heating the cut extruded rod from step B to a temperature above the glass transition temperature of the rod while rotating the rod fully supported on roller means; and
    D. cooling the heated rod from step C at a controlled rate while rotating the rod fully supported on said roller means.

2. In a method according to claim 1, the improvement wherein the roller means is rotated at a constant speed.

3. In a method in accordance with claim 1, the improvement wherein said rods are maintained at a temperature below the glass transition of the rod.

4. In a method according to claim 1, the improvement wherein said polymeric rod comprises an acrylic rod.

5. In a method according to claim 1 wherein said rod, upon cooling is substantially free of all internal stresses, bubbles and voids.

6. In a method according to claim 1, the improvement wherein said rods are slowly and uniformly cooled following extrusion.

7. In a method according to claim 6, the improvement wherein said rods are insulated during cooling.

8. In a method according to claim 6, the improvement wherein said rods are subjected to low level heat during cooling.

9. Apparatus for producing round rod formed of thermoplastic material, comprising an extruder for forming a round rod, and a post-extrusion heat treating means comprising an oven containing a plurality of rollers having axis parallel to one another for rotating and fully supporting said rod with the axis of the rod parallel to the axis of said rollers for a predetermined period of time.

10. Apparatus according to claim 9, and including means for maintaining said rollers at a temperature different from the free space temperature of the oven.

11. Apparatus according to claim 9 wherein said rollers are formed of metal coated on the outer surface with a polyethylene terephthalate coating.

12. Apparatus according to claim 10 wherein said rollers are hollow at least in part, and including means for circulating a heat exchange fluid through said rollers.

13. Apparatus according to claim 9, and further including means for slowing the rate of cooling of said rods following extrusion to their solid state.

14. Apparatus according to claim 13, wherein said means for slowing the rate of cooling comprises heat insulating means.

15. Apparatus according to claim 13, wherein said means for slowing the rate of cooling comprises heating means.

16. Apparatus according to claim 15, wherein said heating means comprises convection heating means.

* * * * *